(12) United States Patent
Mao et al.

(10) Patent No.: US 11,631,998 B2
(45) Date of Patent: Apr. 18, 2023

(54) HIGH PERFORMANCE WIRELESS POWER TRANSFER AND POWER CONVERSION TECHNOLOGIES

(71) Applicants: Hengchun Mao, Allen, TX (US); Ted Tianqi Mao, Allen, TX (US); Xuezhong Jia, Allen, TX (US)

(72) Inventors: Hengchun Mao, Allen, TX (US); Ted Tianqi Mao, Allen, TX (US); Xuezhong Jia, Allen, TX (US)

( * ) Notice: Subject to any disclaimer, the term of this patent is extended or adjusted under 35 U.S.C. 154(b) by 179 days.

(21) Appl. No.: 16/735,032

(22) Filed: Jan. 6, 2020

(65) Prior Publication Data
US 2020/0227946 A1 Jul. 16, 2020

Related U.S. Application Data

(60) Provisional application No. 62/790,745, filed on Jan. 10, 2019.

(51) Int. Cl.
| | |
|---|---|
| *H02J 50/12* | (2016.01) |
| *H02J 50/70* | (2016.01) |
| *H02M 3/07* | (2006.01) |
| *H02J 50/80* | (2016.01) |

(52) U.S. Cl.
CPC ............ *H02J 50/12* (2016.02); *H02J 50/70* (2016.02); *H02M 3/072* (2021.05); *H02J 50/80* (2016.02)

(58) Field of Classification Search
CPC ............ H02J 50/12; H02J 50/70; H02J 50/80; H02M 3/072
See application file for complete search history.

(56) References Cited

U.S. PATENT DOCUMENTS

| | | | |
|---|---|---|---|
| 10,193,468 B1* | 1/2019 | Yang | H02M 7/4837 |
| 2011/0304306 A1* | 12/2011 | Galal | H02M 3/07 |
| | | | 323/282 |
| 2013/0181537 A1* | 7/2013 | Onizuka | H01F 38/14 |
| | | | 307/104 |
| 2013/0234531 A1* | 9/2013 | Budgett | H04B 5/0037 |
| | | | 307/104 |
| 2015/0207330 A1* | 7/2015 | Petersen | H02J 5/005 |
| | | | 307/104 |
| 2015/0280455 A1* | 10/2015 | Bosshard | B60L 53/126 |
| | | | 307/104 |
| 2016/0056640 A1* | 2/2016 | Mao | H02J 50/80 |
| | | | 307/104 |
| 2016/0181987 A1* | 6/2016 | Perreault | H03F 1/0205 |
| | | | 330/251 |
| 2017/0040695 A1* | 2/2017 | Rajagopalan | H02J 7/025 |
| 2017/0093167 A1* | 3/2017 | Von Novak, III | H02J 7/025 |
| 2017/0179715 A1* | 6/2017 | Huang | H02M 3/155 |
| 2019/0238053 A1* | 8/2019 | Oliva | H02M 7/12 |

(Continued)

*Primary Examiner* — Harry R Behm

(57) ABSTRACT

A system includes a first device, a second device, and a power control block. The first device has a first power converter and a first resonator which has a first resonant capacitor and a first coil. The second device has a second power converter and a second resonator which has a second resonant capacitor and a second coil. The second power converter is coupled to a ratio-controllable power converter, and the first coil and the second coil are magnetically coupled. The power control block is configured to adjust the system frequency, the second power converter output voltage and the current in the first coil in coordination.

20 Claims, 22 Drawing Sheets

(56) References Cited

U.S. PATENT DOCUMENTS

2019/0386518 A1* 12/2019 de Rooij ................ H02J 50/12
2020/0099257 A1*  3/2020 Qiu ....................... H01M 10/46
2021/0013742 A1*  1/2021 Nakao .................... H02J 50/80

* cited by examiner

1100

| | S1 | S2 | S3 | S4 | Sx1 | Sx2 | Sx3 |
|---|---|---|---|---|---|---|---|
| Charging Phase | ON | OFF | OFF | ON | ON | ON | OFF |
| Discharging Phase | OFF | ON | ON | OFF | OFF | OFF | ON |

(a) $V2 = \frac{2}{3}V1$

| | S1 | S2 | S3 | S4 | Sx1 | Sx2 | Sx3 |
|---|---|---|---|---|---|---|---|
| Charging Phase | ON | OFF | OFF | ON | ON | ON | OFF |
| Discharging Phase | OFF | ON | ON | OFF | ON | ON | OFF |

(b) $V2 = \frac{1}{2}V1$

| | S1 | S2 | S3 | S4 | Sx1 | Sx2 | Sx3 |
|---|---|---|---|---|---|---|---|
| Charging Phase | ON | OFF | OFF | ON | OFF | OFF | ON |
| Discharging Phase | OFF | ON | ON | OFF | ON | ON | OFF |

(c) $V2 = \frac{1}{3}V1$

Figure 11

HIGH PERFORMANCE WIRELESS POWER TRANSFER AND POWER CONVERSION TECHNOLOGIES

CROSS REFERENCE TO RELATED APPLICATIONS

This application is related and claims priority to U.S. Provisional Application No. 62/790,745, titled, "Efficient Wireless Power Transfer Systems with Variable Gain Converters" filed on Jan. 10, 2019, which is herein incorporated by reference.

TECHNICAL FIELD

The present invention relates to power conversion and power transfer systems, and, in particular embodiments, to advanced wireless power transfer and power conversion topologies and control techniques suitable for high performance applications.

BACKGROUND

Wireless power transfer (WPT) is important for many applications due to better customer experience and better tolerance to harsh environment. Although the basic theory of WPT has been known for many years, and WPT products have been used in some applications such as wireless charging for mobile devices in recent years, it has been a challenge to achieve high efficiency wireless power transfer at low cost. Technical improvements are needed to provide viable solutions the mass market, to realize wireless quick charging at higher power and higher efficiency for mobile applications such smart phones, wearables, drones and electrical vehicles.

Power efficiency, magnetic emission, reliable and robust operation, and system cost have been critical factors impacting the wide adoption of WPT technologies. Especially, in many applications the receiver (RX) has limited space, and the stringent restriction on size and thermal budgets significantly impacts system design and operation. In other applications the limiting factor may be the power loss of the transmitter power amplifier, the system efficiency, system cost, or the emission level of the system. Therefore, it is very important to develop creative and systematic tradeoffs to optimize system performances while relieving the stresses such as power losses of certain critical components.

SUMMARY OF THE INVENTION

These and other problems are generally solved or circumvented, and technical advantages are generally achieved, by preferred embodiments of the present invention which provides improved wireless power transfer devices, systems and methods.

According to one embodiment of this disclosure, a system includes a first device, a second device, and a power control block. The first device has a first power converter and a first resonator which has a first resonant capacitor and a first coil. The second device has a second power converter and a second resonator which has a second resonant capacitor and a second coil. The second power converter is coupled to a ratio-controllable power converter, and the first coil and the second coil are magnetically coupled. The power control block is configured to adjust the system frequency, the second power converter output voltage and the current in the first coil in coordination.

According to another embodiment of this disclosure, an apparatus for a power system includes a resonator, a power converter and a controller. The resonator has a resonant capacitor and a coil, and is configured to operate in at least two distinct frequency bands, in which at least one of the coil and the resonant capacitor is configured to have different equivalent values in different frequency bands. Thea power converter has a port with a dc voltage, which is configured to have different values in different frequency bands. The controller coordinates the adjustment of the dc voltage with a change of frequency band or a power output of the power system.

According to yet another embodiment of this disclosure, a device includes a switch-capacitor network, a plurality of power switches, an input capacitor with an input voltage, an output capacitor with an output voltage, and a controller. The switch-capacitor network has a plurality of control switches and a plurality of capacitors, with the control switches configured to put the capacitors in series in a first configuration of operation and in parallel in a second configuration of operation. The controller is configured to control the power switches and the control switches in synchronization, so that the switch-capacitor network is operated as an energy transfer switch to be coupled to the input capacitor and the output capacitor in different ways and with different configurations during a charging phase and a discharging phase, and the ratio of the output voltage and the input voltage are programmable through configuring the control switches to have different configurations in the charging phase or in the discharging phase.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 11 illustrates the various operation states of the switched-capacitor converter shown in FIG. 10 in accordance with various embodiments of the present disclosure;

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely in wireless power transfer and power conversion technologies for mobile devices. The invention may also be applied, however, to a variety of other electronics systems, including integrated circuits, CPUs (central processing units), computers, telecom equipment, electric vehicles, any combinations thereof and/or the like. Hereinafter, various embodiments will be explained in detail with reference to the accompanying drawings.

Figure 1:
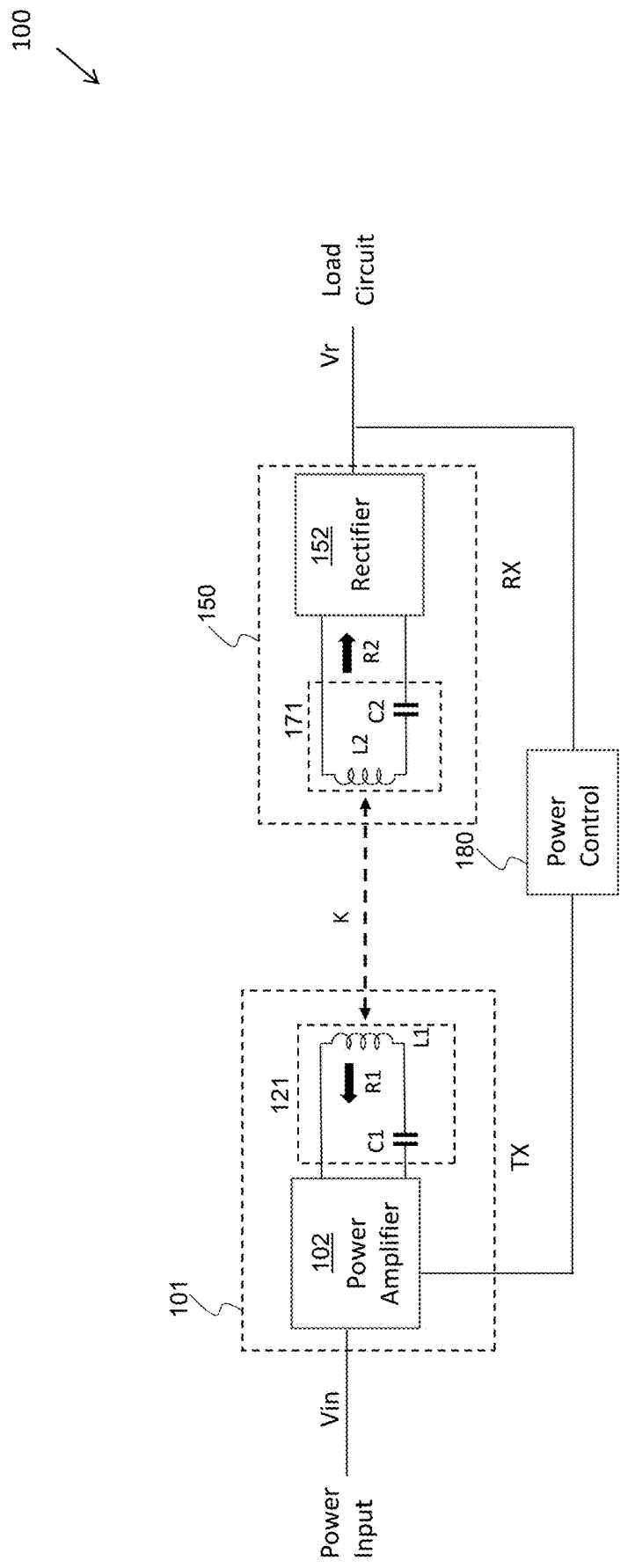
FIG. 1 illustrates a schematic diagram of a wireless power transfer system.

FIG. 1 shows a typical WPT system compatible with magnetic resonance (MR) or Magnetic induction (MI) technologies, which includes a power transmitter (TX) 101 and a power receiver (RX) 150. When a RX 150 is placed in the proximity of a suitable TX 101, a magnetic coupling (with a coupling coefficient K) is established between an TX coil L1 and a RX coil L2, which allows power to be transferred between RX 150 and TX 101. L1 and L2 operates more or less like a power transformer, but the performance of the power transformer heavily depends on the magnetic coupling coefficient, which in a WPT system may be much lower than in a typical power supply. As a result, special techniques are needed to transfer a good amount of power efficiently. The magnetic coupling coefficient K in a WPT changes in a range determined by the sizes and relative position of TX and RX coils, and thus the allowed range of K determines to a large degree the user experience of the WPT system. The power transfer may be bidirectional, i.e. a RX may transfer power out to function as a transmitter, while a TX may receive power to function as a receiver. To enable wireless power transfer, a power amplifier 121 (i.e. a power converter or inverter) in the TX 101 produces a high-frequency ac voltage and/or current and applies it to the transmitter coil L1, which may form a resonant tank (resonator) 121 with a resonant capacitor C1. The frequency and/or duty cycle of the high frequency ac waveform may be controlled to achieve power regulation in some applications or operation modes, or may be fixed in some other applications or operation modes. Multiple transmitters or receivers may exist in a particular system, but the power transfer mechanism of such systems is similar to the single TX-RX system. A single TX-RX system will be used to describe the invention below, but the techniques can also be used in multiple RX or TX systems.

The high-frequency voltage produced by the power amplifier/converter 102 is usually fed to a TX resonator 121 comprising a resonant capacitor C1 and a transmitter coil L1. The power receiver 150 comprises a RX resonator 171 (comprising a RX resonant capacitor C2 and a RX coil L2) and a RX rectifier 152, which can transfer the ac voltage/current in the RX resonator 171 to a dc output voltage Vr (or a dc current flowing into Vr). The output voltage Vr can be applied to various load circuits, including batteries and/or down-stream power converters. The power control block 180, sometimes to regulated the output voltage and sometimes to regulate the output current supplied to the load circuit, is usually implemented as a voltage control, a frequency control, or a duty cycle control of the power converter 102 or a pre-regulator converter in TX 101. As TX 101 and RX 150 are usually different physical units, to implement the power control a communication channel between TX 101 and RX 150 is usually needed. Sometimes this communication is through in-band communication which modulates a frequency, voltage/current, or load in the RX 150 or TX 101. Sometimes this communication is through out-band communication such as a Bluetooth or NFC (near-field communication) channel.

For higher power WPT applications, it is usually more desirable to achieve a high efficiency while keeping the magnetic emission to the environment and the power losses in the RX or TX within limits. The coils L1 and L2 are key components of a WPT system, and can often determine the performance of the system to a large degree. Assuming L1 has N1 turns and conducts a current with a RMS value of I1 at frequency f, and L2 has N2 turns and conducts a current with a RMS value of I2 at frequency f For a given amount of space, the resistance and inductance of a coil are approximately proportional to the square of its number of turns (N1 for L1, and N2 for L2). The power losses in RX 150 is usually dominated by the power loss in the receiver coil L2, and to reduce the power loss of L2 or other components in the RX, it is sometimes desirable to increase the output voltage Vr of the rectifier 152 to reduce the current in the coil L2 for a given output power Po, as the power loss in L2 is proportional to $(N2Po/Vr)^2$. A receiver coil loss factor Kp2=N2/Vr can be developed, which is related to the power efficiency and power loss of L2 for a given output power Po. The power loss of other components such as MOSFET switches in the rectifier circuit also decreases with the increase of Vr. When the receiver resonator 171 operates at its resonant frequency as with MR technology (which results in maximum power transfer for a given transmitter coil current (I1)), it can be proven that under ideal condition Kwpt=N1N2K fI1/Vr is a constant. This indicates that in an MR system, Vr strongly depends on transmitter coil current I1, transfer frequency f and the coupling coefficient K, regardless of power transferred. Considering that magnetic coupling coefficient K does not change fast dynamically and cannot be intentionally controlled once a design is fixed, f and/or I1 may be controlled in coordination to regulate the output and control Vr, and a change of K may be compensated by adjustment off and/or I1. Also, by setting Vr to a right value I1 or f may be optimized to get lower power loss in TX and/or to reduce or mitigate the magnetic emission. Alternatively, the magnetic coupling coefficient K may be indirectly measured through the above equation by measuring Vr. By comparing the ratio of Vr/(fI1) at different capacitance of C2, the capacitance of C2 which brings the resonant frequency of the resonator 171 in RX (the resonant tank of L2 and C2) closest to f can be found, and this can be used to tune the RX resonator. If the RX resonator operates at a frequency different from its resonant frequency (as in the common magnetic induction technology), I1 will be higher than indicated by the above equation or Vr will be lower for the same I1. Considering that the strength of the magnetic field emitted from the transmitter is proportional to Kh1=N1I1 (which is also a good indicator of power losses of the TX coil), then the design constraint can be rearranged as:

Kwpt=Kh1Kp2Kf

So, the maximum power transfer is related to the maximum allowed emission(or maximum power loss in the transmitter coil), maximum loss in the receiver coil, the required user experience (which determines the range of magnetic coupling coefficient K) and the system frequency. From a physics point of view, the emission level, receiver power loss, user experience and transmission/transfer frequency f (also referred as the system frequency) are all linked together, and any of them cannot be independently adjusted without impacting the others and the transferrable power. One interesting aspect is that increasing system frequency can increase the allowable power level of the system even if the emission level and power losses of the RX coil and/or the TX coil are kept at roughly the same level. Therefore, when high power is needed to be transferred, the system frequency can be increased if possible. The above formula can also be arranged to show the effect of other performance parameters such power losses of other key components, or system variables such as the input voltage Vin.

Establishing this relationship can help the design and control of the system in various ways. For example, Vin may be calculated from system requirements for any given output, and be adjusted in operation via a feedforward control instead of a slower feedback control. Furthermore, to maintain a high performance system, for a given user experience or user case scenario (thus a certain range of K), the system frequency f and RX rectifier voltage Vr (which determines Kp2) can be adjusted in coordination to simultaneously improve system power efficiency and keep magnetic emissions and power loss of the RX and/or TX within budget.

Figure 2:
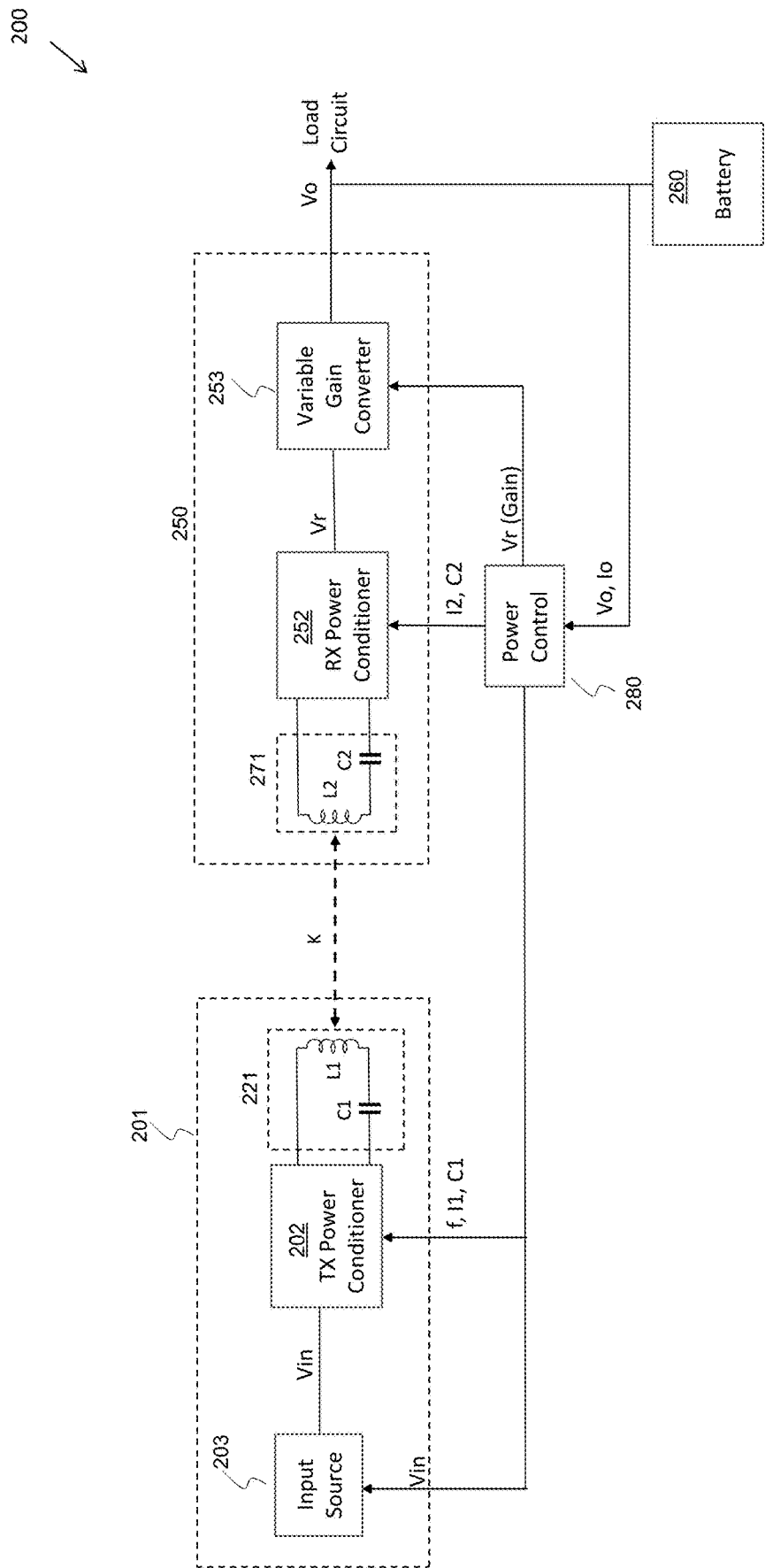
FIG. 2 illustrates a first illustrative embodiment of a wireless power transfer system in accordance with various embodiments of the present disclosure.

FIG. 2 shows a block diagram to implement such a coordinated control mechanism. A variable gain converter 253 is inserted between the RX rectifier 252 and the output Vo in the power receiver (RX) 250, in order to have a freedom of intentionally adjusting Vr. Vo may be applied to load circuit such as a battery 260 as a battery may be required in many mobile applications. The rectifier 252 may be implemented as a power converter usually with synchronous rectification and may integrate some resonance control such as adjusting the capacitance of resonant capacitor C2, so it may become a power conditioner. The RX resonator 271 comprises a RX coil L2 and a resonant capacitor C2, and its resonant frequency may be controlled by the RX power conditioner 252. Similarly the power converter (power amplifier) 202 in the power transmitter (TX) 201 may integrate resonance control and other functions so it also becomes a power conditioner. This architecture is bidirectional, and thus the role of transmitter and receiver is reversible. TX coil L1 and TX resonant capacitor C1 form the TX resonator 221. The resonant frequency of the TX resonator 221 may be controlled by the TX power conditioner 202. To facilitate power control, the input voltage Vin to the TX power conditioner 202 may be adjustable by controlling the input source 203.

The power control block 280 controls the RX 250 and/or the TX 201 by coordinating a set of parameters, such as Vr, I2, I1, Vin and/or f based on the output voltage Vo or output current Io, as well as other system requirements. It may also adjust the resonator's resonant frequencies by changing or switching resonant component values such as C1 and/or C2 when desired. Various control methods can be used to control the power transfer between the TX and the RX. For example, the system frequency f may change among different and distinct bands (i.e. there is a significant gap between two bands), such as between IMS bands 27.12 MHz, 13.56 MHz,and 6.78 MHz, and low frequency bands such as 110 kHz to 205 kHz, 79-90 KHz and 59-61 KHz etc. These bands are usually apart from each other due to radio spectrum management and thus are distinct. To have a better control of system, the resonant frequency of the resonators 221 and/or 271 may also be changed or switched between different values by changing or switching the capacitance of the resonant capacitor or the inductance of the coil. For example, a capacitance may be changed by switching on or off a few capacitor branches in parallel or in series. If the number of branches is small, for example less than 4, the step of capacitance change may be big. To get finer control, a resonator may operate at two modes with different values (preferably adjacent values) of its resonant capacitor and/or coil (inductor), and the duty cycle of working at each mode can be adjusted to effectively control the equivalent capacitance of the capacitor or the equivalent inductance of the coil (inductor). The frequency of the mode change modulates the emission spectrum of the system, and thus should be determined according to EMI requirements. In addition, the input voltage to the transmitter, Vin, may be adjusted to provide necessary power control in synchronization with Vr and f when Vin is controllable. Below are some examples of the coordination control strategy:

1). Vr, f and I1 should be controlled in coordination, and unless the resonant frequency of the RX can be actively controlled so it can operate away from the resonant point in a controlled fashion, only two of the parameters Vr, I1, and f can be changed independently. For example system frequency f may be used to regulate the output (usually higher power requires higher frequency, possibly in a high frequency band) and I1 be used to position Vr to a good value for system performance, and alternatively I1 may be used to regulate the output and f be used to position Vr to a good range for the required output power for performance optimization. In this way, the output regulation and performance optimization can be separated, and performed in sequence or in parallel, making it possible to achieve both reliably in a simple control scheme;

2). When Vr is practically fixed or cannot be adjusted freely, for example when Vr powers a battery directly or through a fixed ratio converter, f and I1 may be used to control the power transfer. If the receiver resonance is not controlled, one of these two parameters may be used to regulate the power transfer. For example, the system frequency f may be fixed or its range is limited to make it easier to tune the resonator in the RX, and I1 (i.e. the magnitude of the current in L1) may be the control parameter to regulate the power transfer. If C2 has several selectable values, changing C2 may also be used to change the output power. If C2 has limited steps, then C2 may switch between two values, and the duty cycle of C2 being at one value may be used to provide finer control.

3). The resonance of the RX resonator, for example its resonance frequency, can be controlled to provide power control, especially when neither Vr nor f can be independently adjusted. The resonance control may be implemented as adjustment of C2 or L2, including a duty cycle control of their values as discussed above so the equivalent capacitance or inductance can be changed smoothly over a relatively wide range.

4). Vr may be controlled to change with the system frequency f and/or output power Po to optimize system performance. When the required power is very high, f may be set to a high value or the high frequency band, and Vr may be set to a high value by setting the voltage ratio (Vr/Vo in FIG. 2) of the variable gain converter 252 to a high value, so the power loss in the RX coil L2 and other components of RX 250 are kept low. When the transfer power is lower, the voltage ratio may be reduced to reduce power loss of other components, for example L1 and other components in TX 201, as well as the magnetic emission of the system. If there is room to adjust the frequency, f may also be reduced when the output power is lower. Especially when the required power is significantly lower, f may be moved to a lower band. This also gives the possibility of operating the WPT system 200 in different frequency bands or according to different standards when the power is different. For example, a wireless charging system for a smart phone may operate at 6.78 MHz or according to the AirFuel standard when the required power is high, and operate at a lower frequency band, for example below 205 KHz or even 148 KHz, or according to WPC's Qi standard, when the required power is low. Especially, when a wireless charger operates at a very low output power or in standby mode, the system frequency and/or Vr may be set to lowest values for lower system loss and magnetic emission. The variable gain converter 253 may be put to pass-through mode in such low-power operation.

5). When f and/or Vr is changed, I1 may be controlled to change in coordination. That is, f and Vr may be used as an input to implement feedforward control of I1, which may be adjusted by, for example, adjusting Vin.

6). The capacitance of C1 and/or C2 may be adjusted to provide better power control, or to set the resonant frequency of the TX resonator 221 and/or RX resonator 271 close to or away from the system frequency f when desired;

7). Vin to the TX power conditioner 202 may be adjusted to provide fine control of power, or may be used to limit the current in the TX coil L1.

8). The control system may adjust the above control parameters including f, Vr and Vin to limit or adjust the coil currents I1, Vr, and/or I2 when the system is operating close to the limit of any component (for example a component getting close to its power loss or temperature limit) or the whole system (for example its magnetic emission).

The power control block 280 may implement the above control through proper communication as discussed previously. The power control block 280 may physically located in the RX 250, TX 201 or be distributed into both. A system function, such as foreign object detection may be performed at a frequency or in a frequency band which is most effective for the function, and thus doesn't need to be carried out at every frequency band the system operates at. This will make the system design simpler and easier, and system operation more reliable and robust.

The variable gain converter 253 may be an inductor based power converter such as a buck converter, boost converter or buck boost converter, which can be configured to adjust Vr while maintaining a suitable voltage or current at its output through duty cycle or other suitable control. Alternatively, it may be a switched-capacitor power converter with a programmable or controllable output/input voltage gain or ratio. Furthermore, it can be a combination of an inductor-based converter and a switched-capacitor converter. The following discussion uses switched-capacitor power converters as preferred examples, as a switched-capacitor power converter may have high efficiency and need small space especially low height, thus are particularly suitable for mobile electronic devices.

Figure 3:
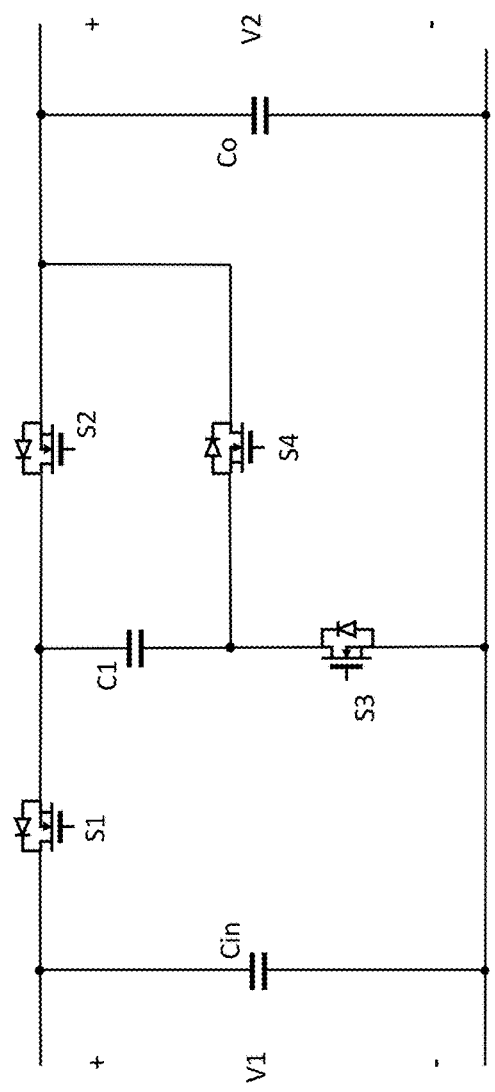
FIG. 3 illustrates a schematic diagram of a switched capacitor converter.

FIG. 3 shows an example of a switched-capacitor converter with a voltage ratio (output voltage/input voltage) of ½. This topology can be bidirectional, but here we treat V1 as the input voltage, and V2 as the output voltage, and the converter provide voltage reduction function. S1 through S4 are power switches. The switched-capacitor converter 300 may work in two modes according to the state of the energy transfer capacitor C1: when S1 and S4 are ON (and thus S2 and S3 are OFF), C1 is in charge stage (and in series with the output capacitor Co); when S2 and S3 are ON (and thus S1 and S4 are OFF), C1 is in discharge stage (and in parallel with the output capacitor Co). When the duty cycle of the switches is 50%, the ripple current of Co is low. However, the ripple current of input capacitor Cin is discontinuous and high. When multiple switched-capacitor converters are operated in interleave, the ripple current of Cin may become continuous and will be much reduced. The interleaved operation also reduces the ripple current of Co further, and thus may be used in higher power converters. When S1 and S2 are both ON, the converter 300 is in pass-through mode, and V2/V1=1, i.e. the voltage ratio is 1. There are other variants of switched capacitor topologies to improve various aspects of the operation.

Figure 4:
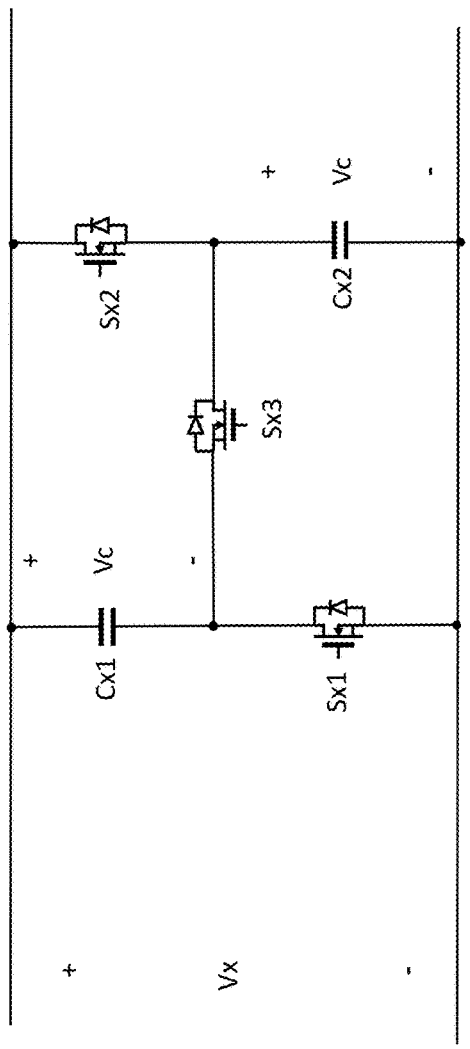
FIG. 4 illustrates a schematic diagram of an embodiment of a controlled asymmetric capacitor network in accordance with various embodiments of the present disclosure.
Figure 5A:
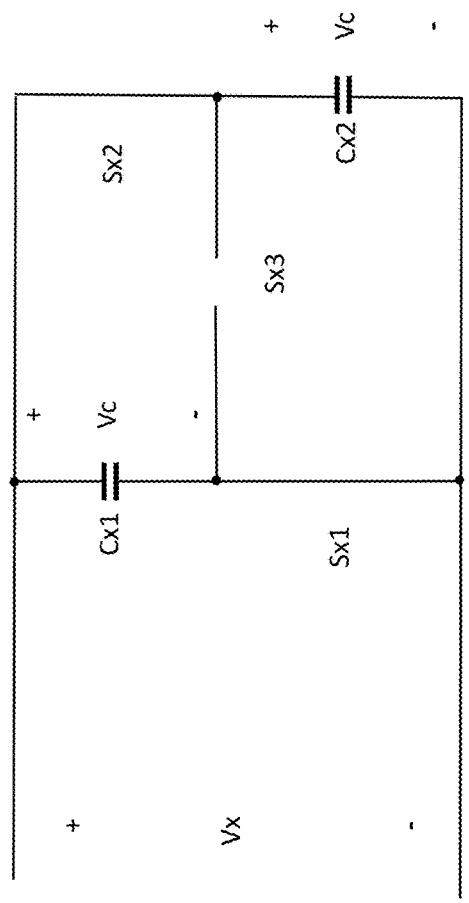
FIG. 5A illustrates an embodiment of first operation configuration of the controlled asymmetric capacitor network shown in FIG. 4 in accordance with various embodiments of the present disclosure.
Figure 5B:
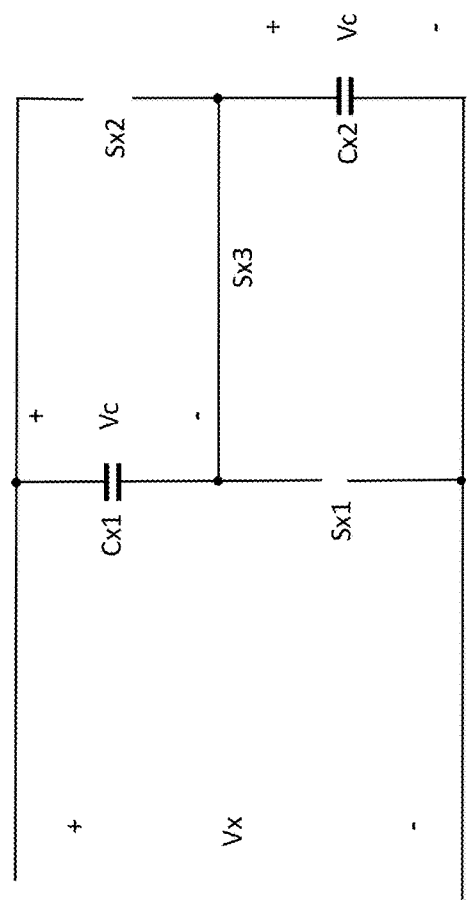
FIG. 5B illustrates an embodiment of second operation configuration of the controlled asymmetric capacitor network shown in FIG. 4 in accordance with various embodiments of the present disclosure.

By changing the energy transfer capacitor C1 in the switched-capacitor converter shown in FIG. 3 to a controlled asymmetric capacitor network (CACN), the voltage ratio (or gain) can be changed and controlled. A CACN is a capacitor network with control switches, and can have different voltage characteristics depending on the states of the control switches. FIG. 4 shows an example of CACN. Depending on the states of the control switches Sx1, Sx2 and Sx3, CACN 400 can exhibit different characteristics. For example, when Sx1 and Sx2 are ON and Sx3 is OFF, Cx1 and Cx2 are in parallel, their voltages will be equalized and Vx, the voltage of the CACN, is equal to Vc, the voltage of each capacitor. This configuration is shown in FIG. 5A. When Sx1 and Sx2 are OFF, and Sx3 are ON, Cx1 and Cx2 are in series, CACN's voltage Vx becomes 2Vc. This configuration is shown in FIG. 5B. Therefore, controlling the switch states can change the voltage of the CACN 400.

Figure 6:
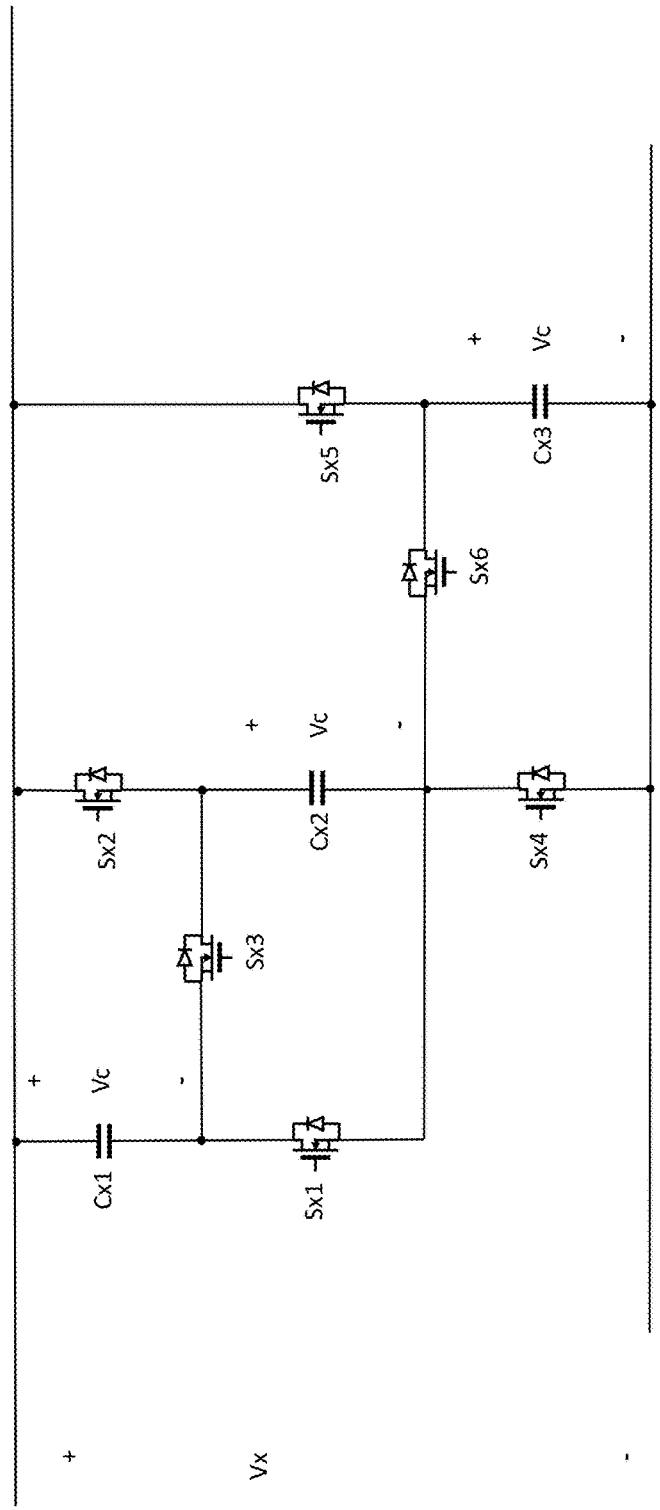
FIG. 6 illustrates a schematic diagram of an embodiment of a three-state controlled asymmetric capacitor network in accordance with various embodiments of the present disclosure.
Figure 7A:
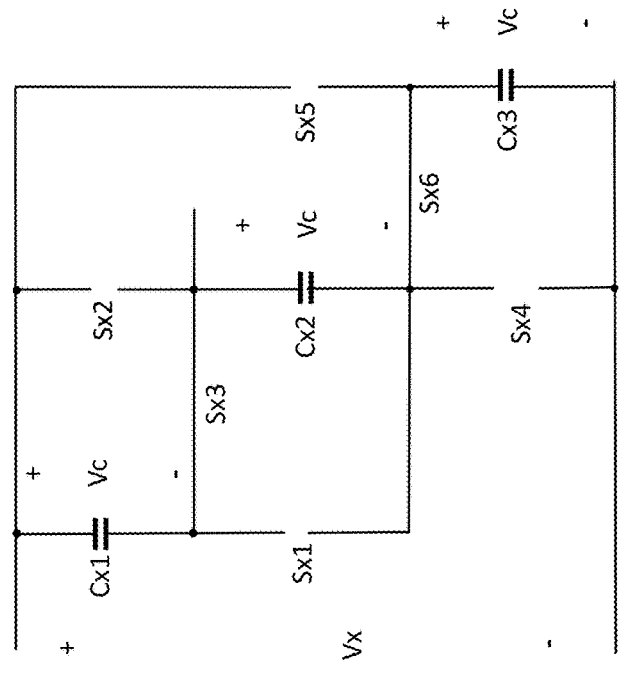
FIG. 7A illustrates an embodiment of first operation configuration of the three-state controlled asymmetric capacitor network shown in FIG. 6 in accordance with various embodiments of the present disclosure.
Figure 7B:
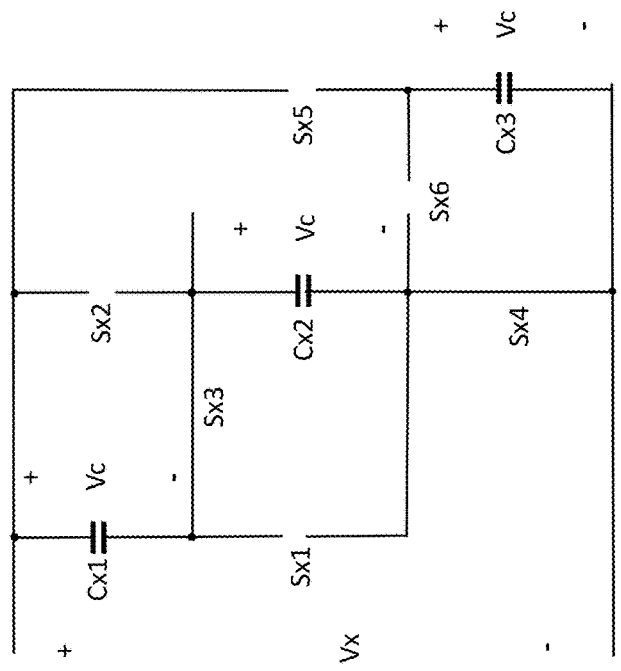
FIG. 7B illustrates an embodiment of second operation configuration of the three-state controlled asymmetric capacitor network shown in FIG. 6 in accordance with various embodiments of the present disclosure.
Figure 7C:
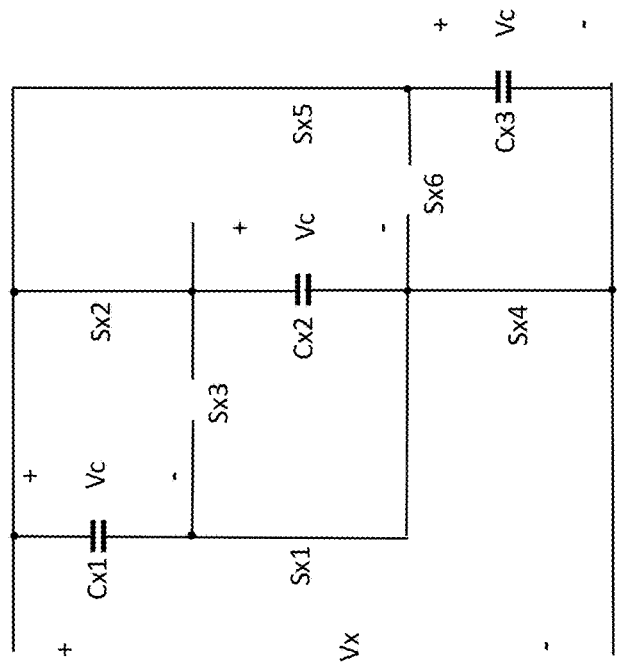
FIG. 7C illustrates an embodiment of third operation configuration of the three-state controlled asymmetric capacitor network shown in FIG. 6 in accordance with various embodiments of the present disclosure.

FIG. 6 shows a CACN with three different configurations which is expanded from the topology shown in FIG. 4. In a steady state, the three capacitors Cx1, Cx2, and Cx3 have the same dc voltage Vc. With different configurations of the control switches Sx1 through Sx6, the CACN's voltage Vx may have different values according to different series or parallel connections of the capacitors: 3Vc (all 3 capacitors are in series as is shown in FIG. 7A), 2Vc (two capacitors are in series as is shown in FIG. 7B), and Vc (all capacitors are in parallel as is shown in FIG. 7C). From the detailed configurations shown in FIGS. 7A, 7B, and 7C, it can be seen that Vx may be controlled to be Vc, 2Vc and 3Vc by switching the control switches Sx1 through Sx6. Please note there are different configurations to implement a configuration of Vx=Vc, but it is generally more desirable to put all three capacitors in parallel for voltage equalization in this phase. Similarly, there are different configurations to implemented Vx=2Vc, and these configurations can be used in turn or just one or two of them are used.

Figure 8:
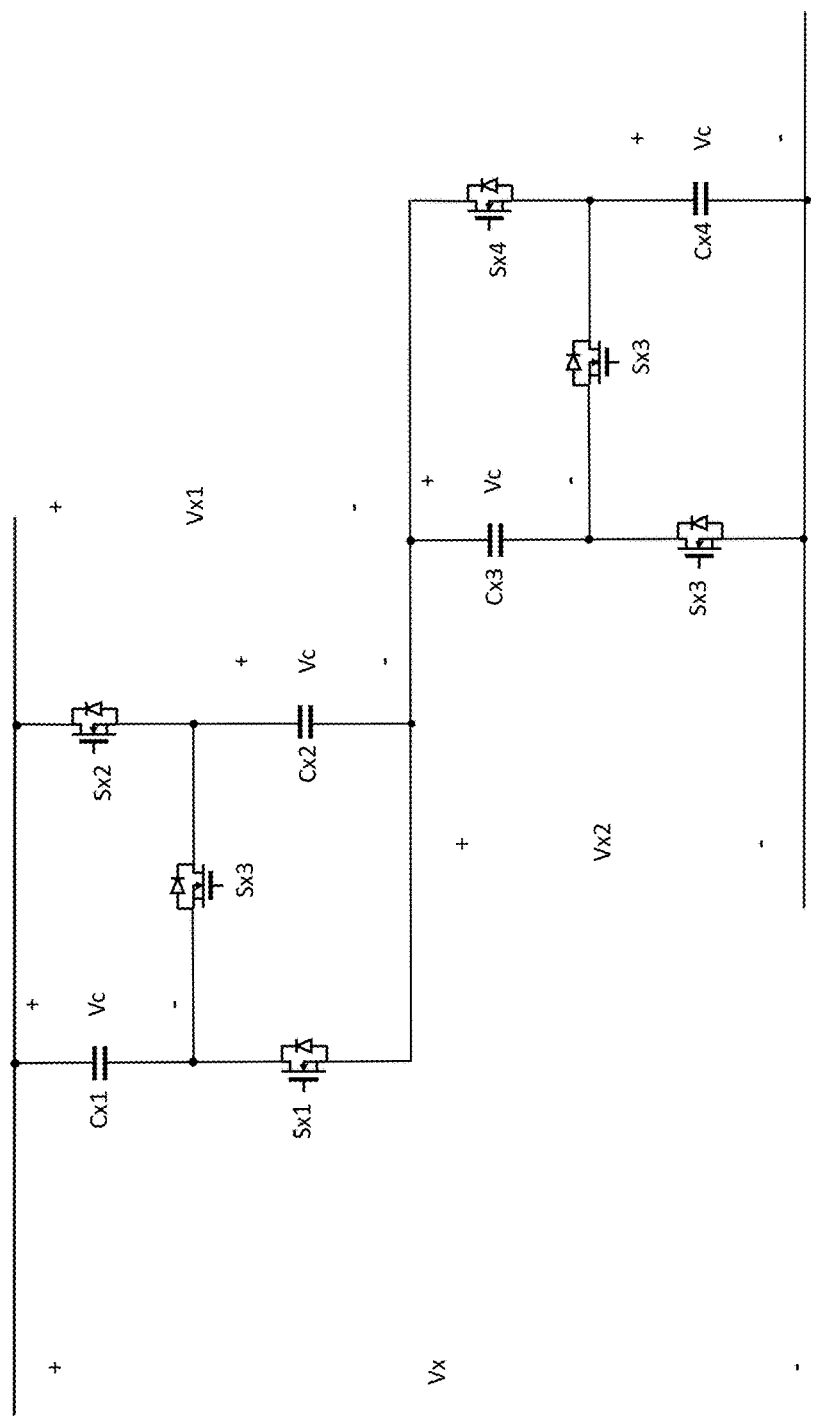
FIG. 8 an embodiment of a cascaded topology of the controlled asymmetric capacitor network shown in FIG. 4 in accordance with various embodiments of the present disclosure.

Similar to switched-capacitor converters, multiple CACNs can also be connected in cascade. FIG. 8 shows a configuration with two CACNs in cascade based on the topology shown in FIG. 4. A cascaded CACN gives more configurations with different voltages.

Figure 9:
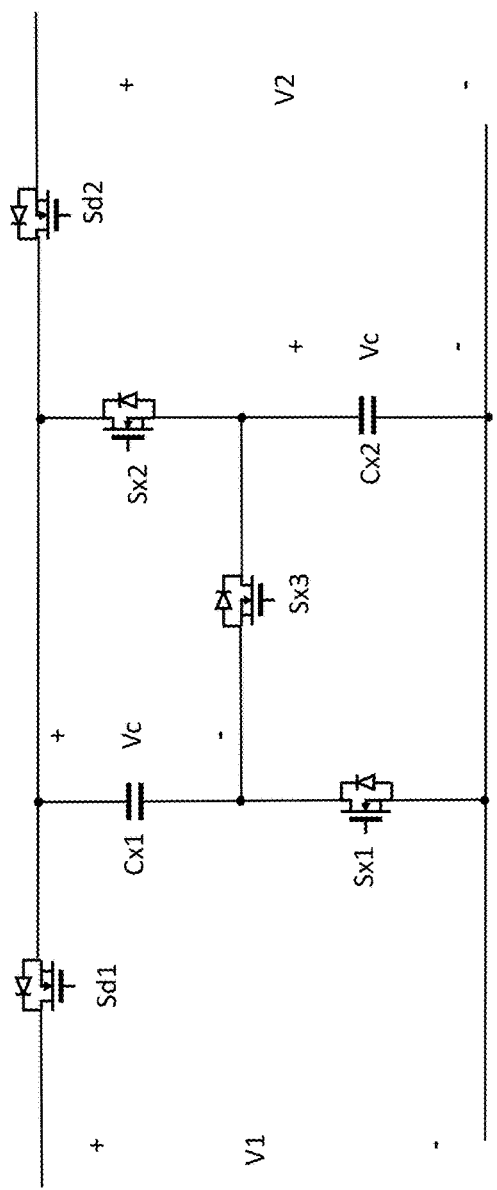
FIG. 9 illustrates an embodiment of a switched-capacitor converter incorporating the controlled asymmetric capacitor network shown in FIG. 4 in accordance with various embodiments of the present disclosure.

A CACN can be directly used as a switched-capacitor converter by adding a disconnecting switch to the left side and right side of the CACN to make an input port and an output port, as is shown in FIG. 9, which is based on the CACN topology shown in FIG. 4. Turning on switch Sd1 connects the CACN to V1 when it is desired, and turning off Sd1 disconnects the CACN from V1 when it needs to be connected to V2. The disconnect switch Sd2 does a similar function to V2. By switching the CACN to different configurations in synchronization with the turn-on and turn-off of disconnecting switches, V1/V2 can be controlled to be approximately constant ratios with different values regardless the load current. For example, when Sd1 is ON and Sd2 is OFF the CACN is controlled to be in the configuration of FIG. 5A, and when Sd1 is OFF and Sd2 is ON the CACN is controlled to be in the configuration of FIG. 5B, then V2=2V1. However, if the CACN is controlled to be in the configuration of FIG. 5B when Sd1 is ON and Sd2 is OFF and FIG. 5A when Sd1 is OFF and Sd2 is ON, then V2=V1½. Similarly, if both Sd1 and Sd2 are turned ON, the the switched-capacitor converter 900 operates in pass-through mode to have V2=V1. As a result, by using the controller 930 the CACN may be controlled in different configurations (states) during different stages, different voltage ratios can be obtained from the switched-capacitor converter. This kind of switched-capacitor converter has at least two different configurations with different output/input voltage ratios apart from a pass-through configuration is referred to as a ratio-controllable (or variable ratio, ratio-programmable) switched-capacitor converter.

Figure 10:
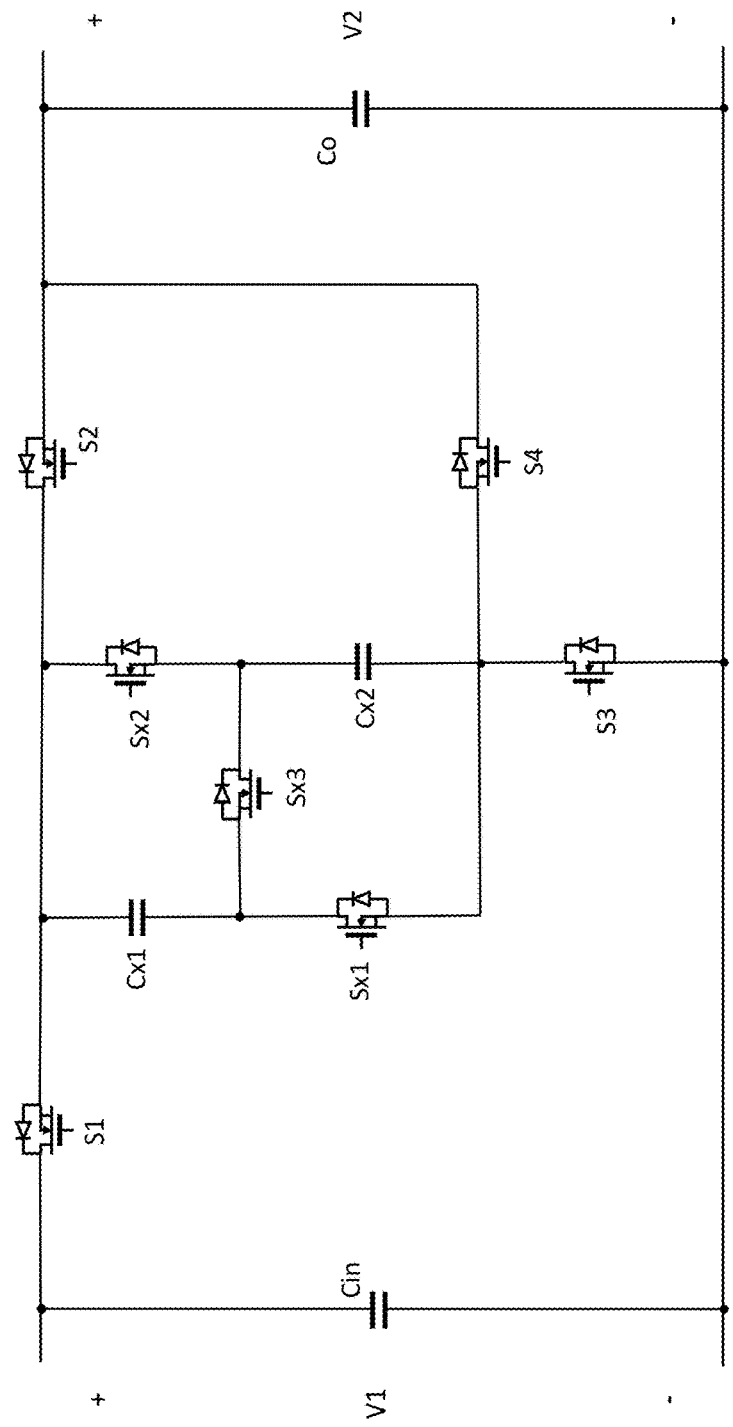
FIG. 10 illustrates an embodiment of a switched-capacitor converter incorporating the three-state controlled asymmetric capacitor network shown in FIG. 6 in accordance with various embodiments of the present disclosure.

Furthermore, in a traditional switched-capacitor converter, an energy transfer capacitor (or an input or output capacitor) may be changed to a CACN structure, and the CACN can be controlled to be in different configurations in the charging stage and discharging stage of the converter, additional output/input voltage ratios can be achieved compared to the traditional ratio converter, resulting in a converter with variable/controlled gain or ratio. FIG. 10 shows an example with the energy transfer capacitor C1 in the topology of FIG. 3 replaced by the CACN shown in FIG. 4. S1 through S4 are the power switches, and Sx1 through Sx3 are the control switches to configure the CACN. If the CACN configuration in the charging phase or in the discharging phase is changed, then the voltage ratio will be changed. By configuring the CACN differently in the charging stage and/or in the discharging stage, the voltage ratio Vo/Vin, i.e. the voltage gain, becomes variable and programmable. FIG. 11 shows that 3 voltage gains, ⅔, ½, and ⅓, can be obtained by controlling the control switches Sx1, Sx2, and Sx3 in the topology of FIG. 10 through controller 1030. As a switched-capacitor converter can also operate in pass-through mode by turning ON both S1 and S2 (i.e. Vo/Vin=1), the variable gain switched-capacitor converter shown in FIG. 10 can have 4 different voltage gains or ratios. More voltage gains can be obtained by using CACNs with more voltage levels such as the one shown in FIG. 6. However, the operating principles remain similar with such variations, and will not be repeated for the sake of brevity.

Figure 12:
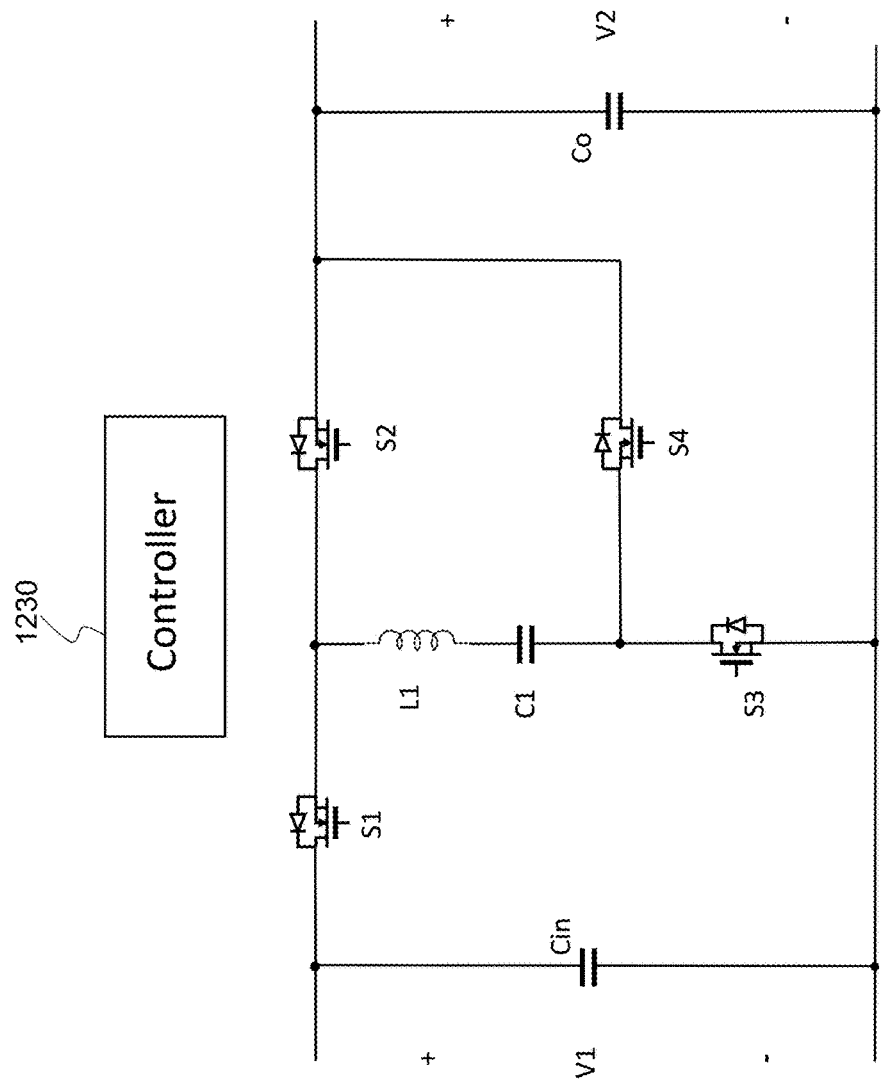
FIG. 12 illustrates an embodiment of a soft-switched switched-capacitor converter topology in accordance with various embodiments of the present disclosure.
Figure 13:
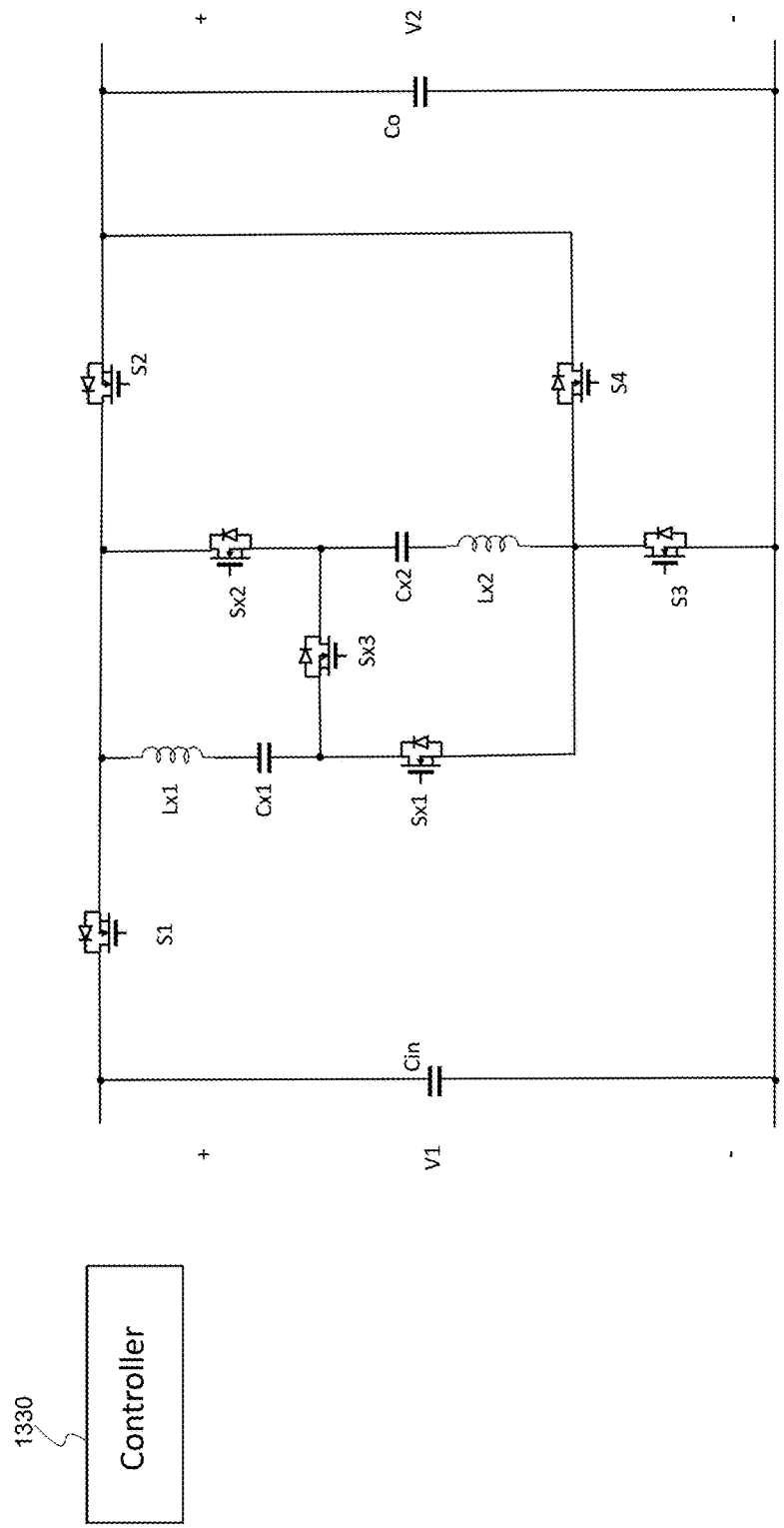
FIG. 13 illustrates an embodiment of a second soft-switched switched-capacitor converter topology in accordance with various embodiments of the present disclosure.

In many applications, it is desirable to reduce the size and cost of the capacitors in a switched-capacitor converter by increasing the switching frequency. To reduce the switching power loss at high switching frequencies, it is desirable to switch the switches under soft-switching conditions such as zero-voltage switching. FIG. 12 shows a zero-voltage switching topology which has an auxiliary inductor L1 in series with the energy transfer capacitor C1. L1 may be a discrete inductor, or parasitic inductance, such as the series equivalent inductance of C1, the packaging inductance of C1 and other components of the converter, including the connecting trace/wire. The soft switching of power switches S1 through S4 can be obtained through controlling their timing with the controller 1230. FIG. 13 shows the soft-switching mechanism extended to the variable gain converter shown in FIG. 10, in which the auxiliary inductors Lx1 and Lx2 may be a discrete inductor, or parasitic inductance as discussed above. Similarly, the soft switching of power switches S1 through S4 and control switches Sx1 through Sx3 can be obtained through controlling their timing in synchronization with the controller 1330.

Figure 14:
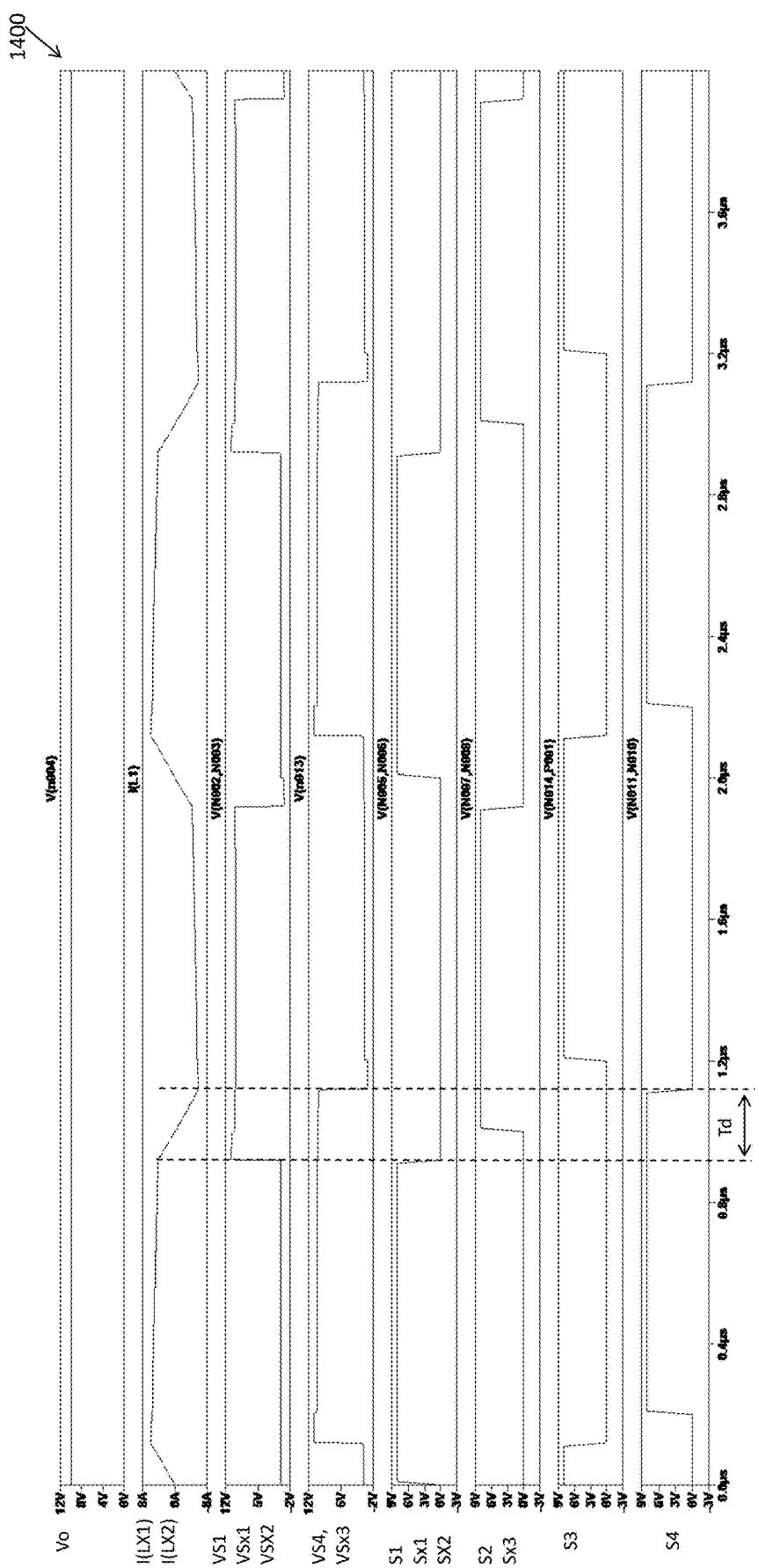
FIG. 14 illustrates simulated operating waveforms of the soft-switched switched-capacitor converter shown in FIG. 13 in accordance with various embodiments of the present disclosure.

In the control of a soft-switched switched-capacitor converter such as the topologies shown in FIG. 12 or FIG. 13, a soft-switching transition can be created by adding a phase shift between the gate timing of power switches and control switches in synchronization, for example between S1 and S2, and between S4 and S3 for the topology shown in FIG. 12. During a phase shift period, the direction of the current in each auxiliary inductor will be reversed. In this way, the auxiliary inductor currents (for example I(Lx1) for LX1 and I(Lx2) for Lx2 in FIG. 13) will have positive and negative values respectively at the start and the end of a phase-shift transition, which allows all switches including the main (power) switches and the control switches to be turned on at a zero voltage, creating soft switching conditions for all switches. FIG. 14 shows simulated typical operation waveforms for the topology shown in FIG. 13, in which Td illustrates the duration of a phase shift period. During this period, the auxiliary inductor Lx1 and Lx2's currents change from positive to negative values. At the start, S1 can be turned off and the positive inductor current will discharge the voltage across S2 gradually to zero, so S2 can be turned on at a zero voltage after a short delay. In synchronization, Sx1 and Sx2 can be turned off, and Sx3 can be turned on at a zero voltage after a delay. At the end of this phase shift period, the inductor currents are negative, so S4 can be turned off, and S3 can be turned on after a short delay after the inductor currents discharging its voltage to zero. Other phase shift periods operate similarly. This kind of phase shift control principle can be used to creating soft switching for all or part of power switches in all configurations. The duration Td may be adapted according to load condition and/or operating voltage to optimize the currents of auxiliary inductors, to achieve good efficiency in all load conditions. Also, the switching frequency of the converter may change according to the load condition. Usually, if the load is high, the switching frequency should be also high to reduce the voltage ripples in the capacitors. If the load is low, the switching frequency can be reduced to reduce power losses and maintain a good efficiency.

Figure 15A:
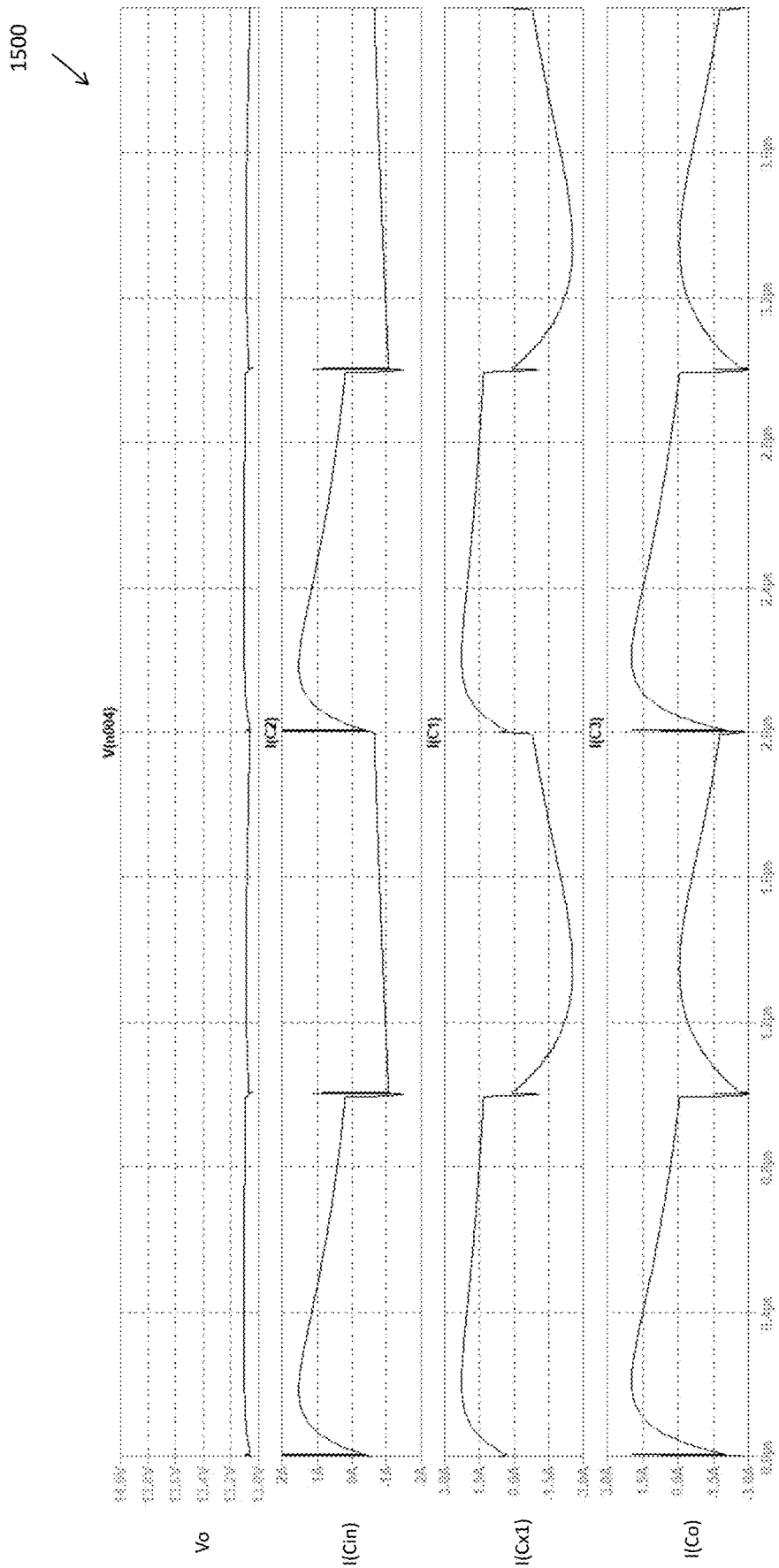
FIG. 15(a) illustrates simulated operating waveforms of the switched-capacitor converter shown in FIG. 10 with S1 a duty cycle of 50% in accordance with various embodiments of the present disclosure.
Figure 15B:
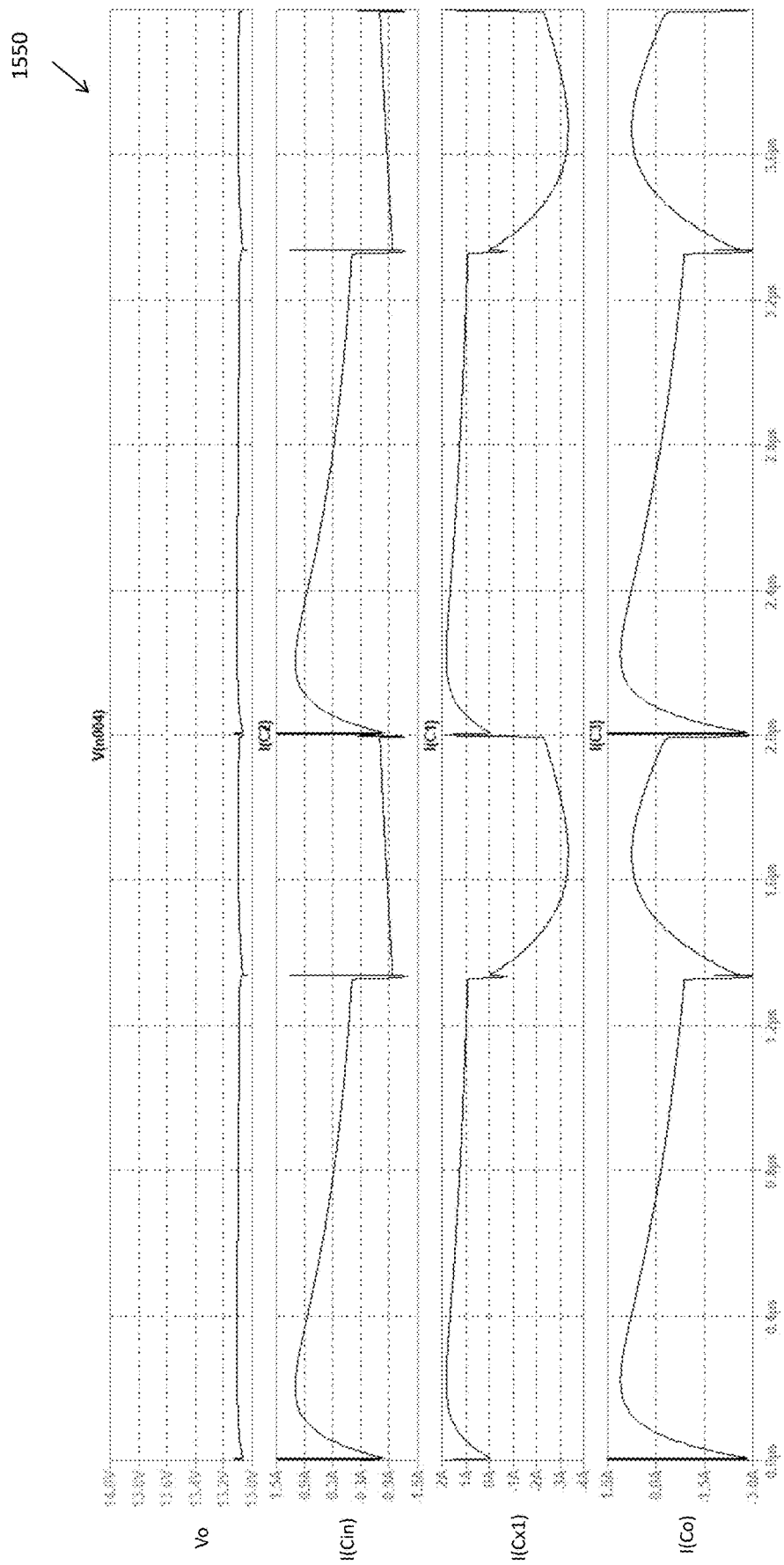
FIG. 15(b) illustrates simulated operating waveforms of the switched-capacitor converter shown in FIG. 10 with S1 a duty cycle of 66.7% in accordance with various embodiments of the present disclosure.

The duty cycle of the switches may change to reduce ripple currents of a capacitor when a variable gain switched-capacitor converter operates at different configurations. FIGS. 15(A) and 15(B) compare the output voltage and currents of the output capacitor Co, input capacitor Cin, and an energy transfer capacitor Cx1, in FIG. 10, under the configuration shown in FIG. 11(a) with the duty cycle for S1 at 50% and 66.7% respectively. We can see that although the output voltage is practically the same, the ripple currents of all capacitors are somewhat different under these different duty cycles. Each capacitor may have different ripple current values under different duty cycles. For examples, when the duty cycle is changed from 50% to 66.7%, the currents in the output capacitor Co and input capacitor Cin are reduced, but the current in the energy transfer capacitor Cx1 is increased. The duty cycle may be used to adjust the ripple current values of the capacitors to improve the operation or to create a balanced operation among the capacitors (and switches). Considering the ripple current values of these capacitors are also inversely proportional to the switching frequency, the duty cycle and switching frequency can be adjusted in coordination to create an optimum operation of the converter in which all power components(the capacitors and the switches) are utilized in good balance.

It may also be sometimes desirable to provide some voltage regulation in a switched-capacitor converter. By adjusting the switching frequency for the switched-capacitor converters shown in FIGS. 9 through 13, the output voltage and thus the voltage ratio may be slightly adjusted. The auxiliary inductors in FIGS. 12-13, and the associated soft-switching transition introduced by the auxiliary inductors, may increase the range of the ratio adjustment. The control switches in the CACN may be controlled to have some resistance and voltage drops in a linear mode, and thus provide additional output voltage adjustment. Also, such linear mode of the control switches can be used during protection, start-up, switchover during a configuration change or other transient operation of the switched-capacitor converters, during which the capacitor voltages may be controlled to have a gradual change or be in low voltage mode. With the variable gain converters which have the capability to provide an output voltage with several rough steps through ratio control, the above voltage adjustment techniques may be used in combination to provide a continuous regulation of the output voltage in some operation modes, in which the voltage gain can be practically continuously adjusted within certain range.

The control switches in the CACN may be controlled to the power loss during a start-up process or other transient operation in these switched-capacitor converters. For example, for the topologies shown in FIG. 10, during one mode of a startup process, such as when both energy transfer capacitors Cx1 and Cx2, and the output capacitor Co all have low voltages, Sx3, as well as S1 and S4 may operate in a linear mode, with Sx1, Sx2, S2 and S3 turned off, so S1, Cx1, SX3, Cx2, S4, and Co are in series, the current through S2 charges Cx1, Cx2 and Co at the same time. The voltages of Cx1 and Cx2 may increase faster than the voltage across Co (because Co is usually relatively big). During another mode, for example in a later phase during a start-up process, significant voltages are established across Cx1 and Cx2, then Sx3 can be turned off, and Sx2 and Sx1 can start operating in linear mode. Cx1 and Cx2 are practically in parallel, and the charging current of Co will be the sum of the charging currents of Cx1 and Cx2. These are examples to reduce the voltages across the switches when they operate in a linear mode to reduce power loss through proper control of control switches in a CACN. Furthermore, as now more capacitors and switches are in series in a ratio-controllable switched capacitor converter compared to a corresponding conventional switched-capacitor converter, the safe-operating area requirements in linear operating mode for the power switches and control switches can be reduced, and some switches may never work in linear mode. This allows the switches to be designed smaller and/or having higher efficiency in operation.

Figure 16:
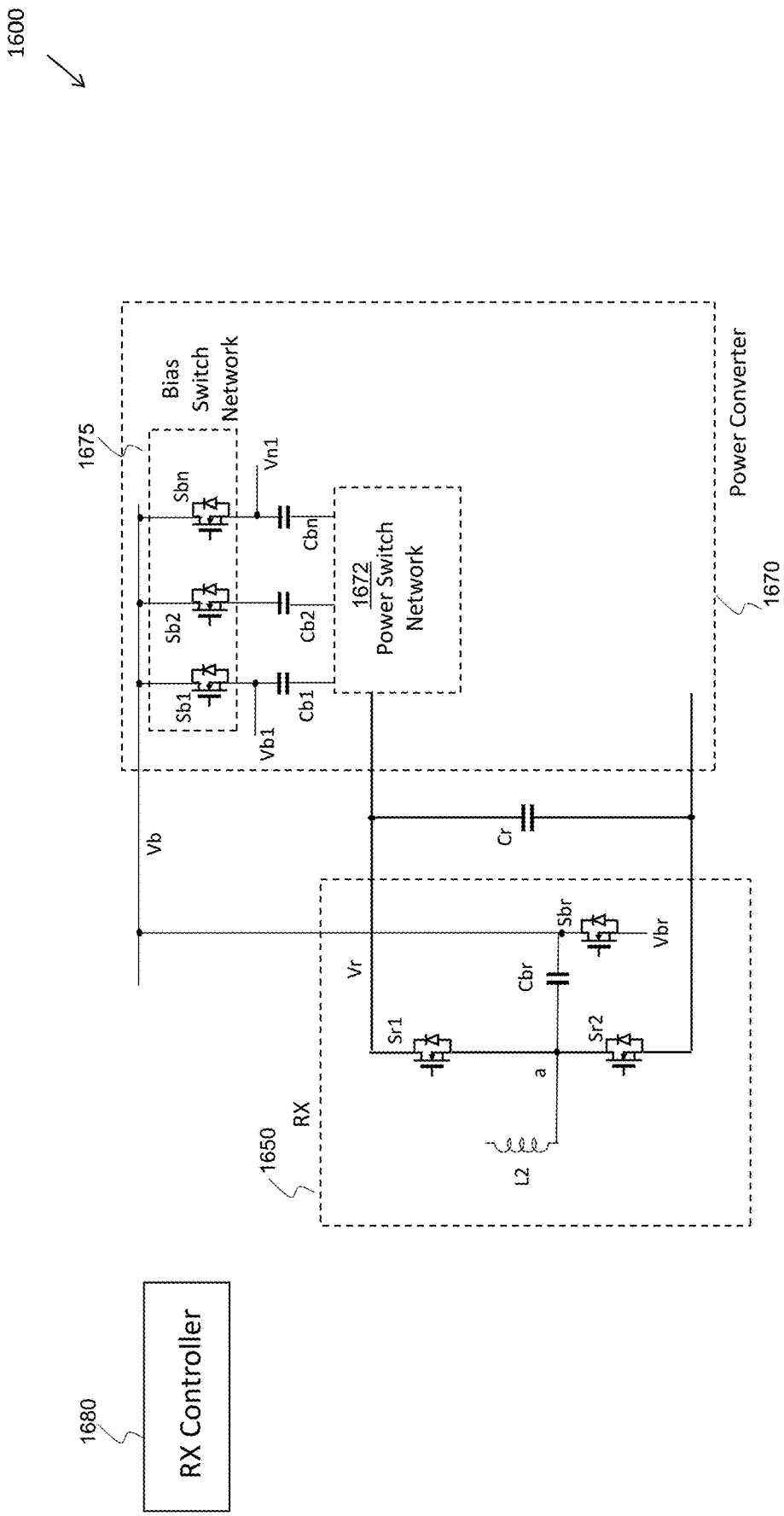
FIG. 16 illustrates an embodiment of a block diagram of a wireless power receiver in accordance with various embodiments of the present disclosure.

A challenge in designing power converters is to provide bias power for the switches, especially the switches at high voltage rails. This can be overcome by integrating the rectifier circuit or other switching circuit in the RX power conditioner (converter) with the downstream power converter, and coordinate their design and control. FIG. 16 shows a block diagram of a RX system 1600 to create bias power for switches in downstream power converter 1670 from the RX circuit 1650. In the rectifier circuit 1650, the receiver coil L2 causes an ac current to flow through the rectifier leg comprising Sr1 and Sr2, and thus connecting point "A" to the high voltage rail and low voltage rail periodically, usually with a good duration as each power switch in the RX 1650 usually conducts at about 50% duty cycle. Thus through a boots-trap switch (or diode) Sbr, the bias capacitor Cbr is charged reliably through a bias power Vbr, which creates a pulsating bias voltage Vb. Vb is then fed to the downstream power converter 1670 through a bias switch network 1675, and can provide bias (control) power to the circuit and power switches in the power switch network 1672 which are the main power switches in power converter 1670. The bias power switch network 1675 consisting of bias switches Sb1 through Sbn can selectively charge the bias capacitors Cb1 through Cbn at the right time, so the voltages across bias capacitors Cb1 through Cbn can be used to power different power switches and control circuits. The bias switches Sb1 and Sbn may be transistors, N-channel or P-Channel MOSFETs, diodes or other suitable switch devices, and bidirectional switches when needed. The control timing of Sb1 through Sbn should be determined such that the voltages Vb1 through Vbn are within a suitable range while the power losses are relatively small, i.e. these switches are turned on when the voltages across them are relatively small, and turned off before the currents through them become negative. To facilitate the control of Sb1 through Sbn, the switching frequency of power switches in the power converter 1670 may be in synchronization with the switches in the rectifier circuit 1650, and the synchronization may be through a decoder or encoder circuit so the switching frequency of a set of switches may be a multiple of the other's. The controller 1680 may have analog and digital circuit, even an MCU with memory. It may be a separate component, or integrated with the power circuit.

In the above discussion, variable gain or ratio converters are used in the RX to improve the operation of the RX and the system by allowing Vr to be optimized. Similarly, variable gain or ratio converters can be used to in TX, for example as part of the input source. Especially, if the WPT system is designed to operate under multiple frequency bands, the input voltage Vin may have to operate over a very wide range. Standards like various quick charge protocols or USB power delivery protocols may be used to provide a voltage control for Vin, and a variable gain or fixed gain power converter may be used to expand the voltage range available to the power converter.

Figure 17:
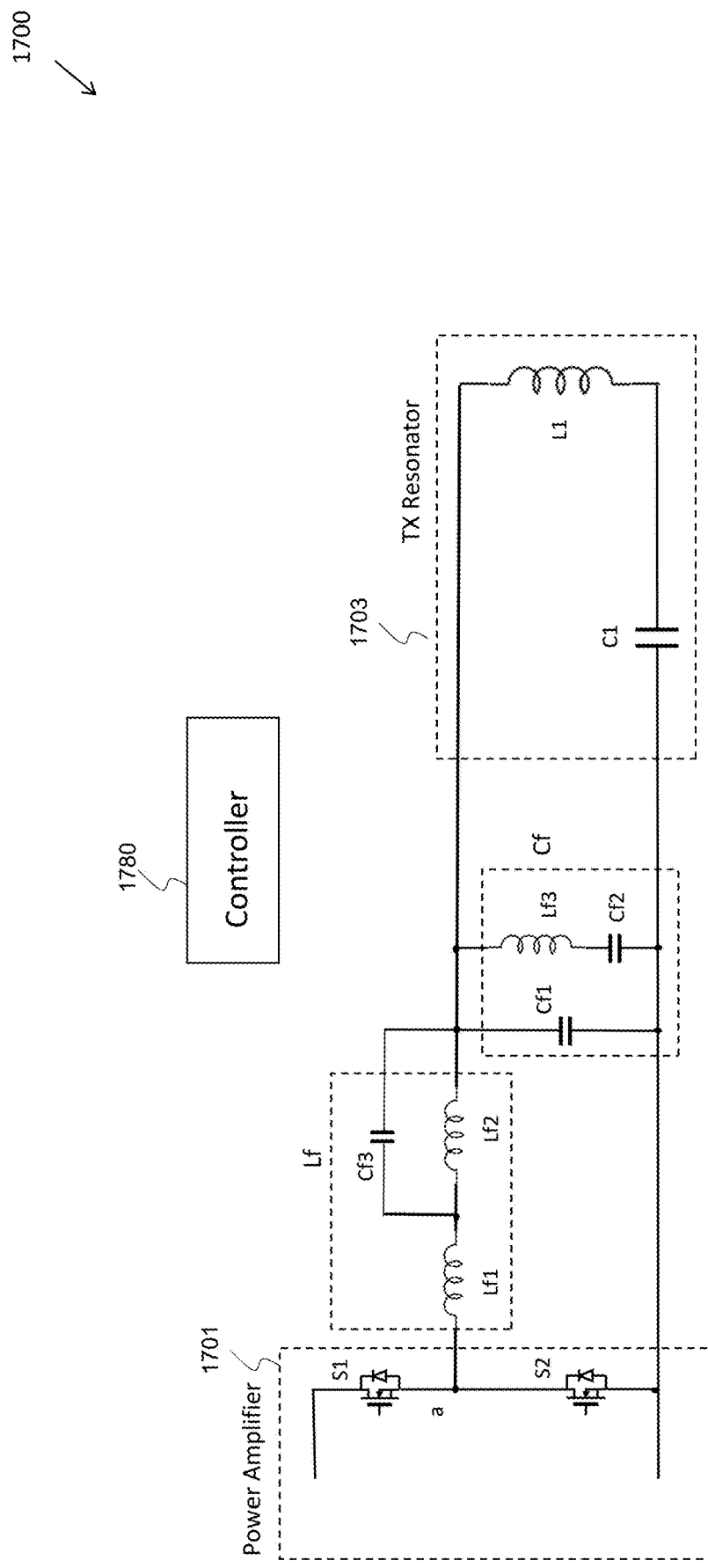
FIG. 17 illustrates an embodiment of a wireless power transmitter with frequency-dependent passive switch network in accordance with various embodiments of the present disclosure.

Another challenge in designing a multi-band WPT is that the values of reactive components, such as capacitors and inductors in filter and impedance matching circuits as well as in the resonators of TX and RX, may have to be switched when the system operation is switched from one frequency band to another. Power switches can be used for such switch-over functions. Furthermore, passive networks with inductors and capacitors in the right values may also be used as switching devices when the two frequency bands are distinct and relatively far apart, for example the 6.78 MHz band and the Qi standard frequency band. FIG. 17 uses an impedance matching circuit in TX as an example. The resonant frequencies of the LC switching networks Lf2 and Cf3, as well as Cf2 and Lf3, are set to around the mid value between the low frequency band and the high frequency band. Therefore, Cf3 can be considered practically open at the low frequency band, and short in the high frequency band. Thus the equivalent inductance of the network Lf is Lf1 in the high frequency band, and Lf1+Lf3 in the low frequency band. Similarly, the equivalent capacitance of the network Cf is Cf1+Cf2 in the low frequency band, and Cf1 in the high frequency band. Also, in the high frequency band Lf3 adds an inductive current to the power amplifier, and thus facilitates the soft-switching of the power switches, such as S1 and S2 from the power amplifier 1701 shown in FIG. 17. In this way, a filter or an impedance matching circuit can have the desired characteristics in multiple frequency bands with the help of simple passive switching networks, which provides different equivalent inductance or capacitance for a reactive component or network at different frequency bands.

Figure 18:
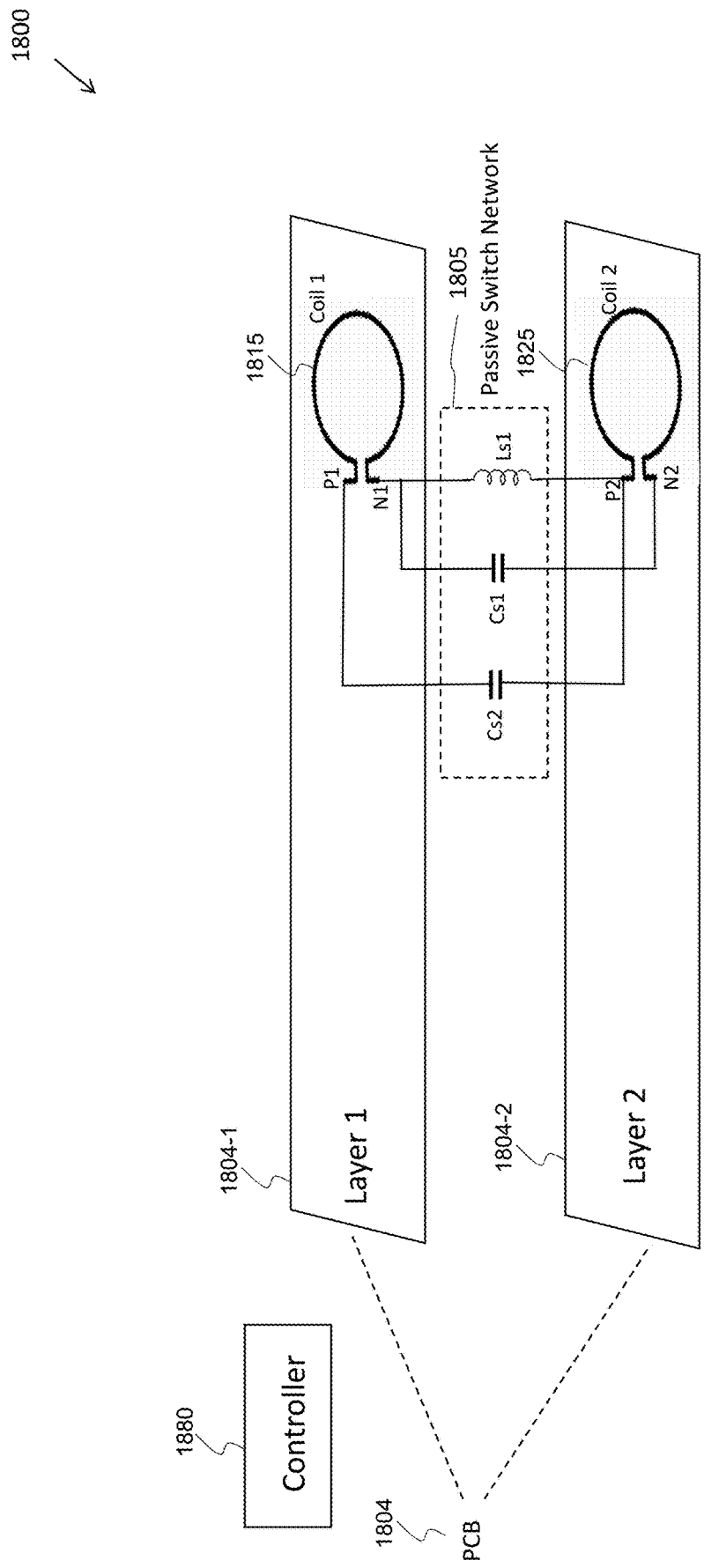
FIG. 18 illustrates an embodiment of a multi-layer coil with frequency-dependent passive switch network in accordance with various embodiments of the present disclosure.

A particular example of implementing a switchable inductor or coil to have different inductance values at different frequency bands is shown in FIG. 18 for an inductor or coil implemented as multiple coils on multiple layers or multiple areas of a carrier or structure such as a multi-layer PCB. In the exemplary drawing of FIG. 18, Coil 1 1815 is implemented on one layer or one area of the PCB 1804 (for example Layer 1 1804-1), and Coil 2 1825 is implemented on another layer or another area of the PCB 1804 (for example Layer 2 1804-2). Coil 1 1815 may or may not be magnetically coupled to Coil 2 1825. Through a passive switch network 1805 comprising Ls1, Cs1 and Cs2, the coils at different layers can be put in parallel at one frequency band, and in series at another frequency band. For example, Coil 1 1815 is practically in series with Coil 2 1825 at a low frequency band, while in parallel with Coil 2 1825 at a high frequency band. Therefore, the inductor or coil consisting of both Coil 1 1815 and Coil 2 1825 will have high equivalent inductance in the low frequency band, and low equivalent inductance in the high frequency band. When the coils have good magnetic coupling such as when they are in the same area of a PCB, this technique can give an inductor or coil with wide inductance ranges. The passive switch components Ls1, Cs1 and Cs2 may be mounted on or embedded within the PCB 1804.

The above discussion is made mainly in the context of wireless power transfer or wireless charging applications. However, the applications of the technologies discussed are not limited to wireless power transfer, and can be used in any other applications, devices and equipment which require high efficiency power conversion and power control. The power technologies can be used in stand-alone power devices, power ICs, power modules and power supplies systems, or be used in devices or systems with power solutions as a built-in function. For example, if L1 and L2 in FIG. 2 are tightly coupled, TX 201 and RX 250 together become a typical high efficiency isolated power supply. In addition to be used as in main power process functions, the technologies presented in this disclosure can also be used in auxiliary functions such as a bias power in an electronic device or equipment.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system comprising:
a first device having a first power converter coupled to a first resonator comprising a first resonant capacitor and a first coil, wherein the first power converter is configured to operate at a system frequency;
a second device having a second power converter coupled to a second resonator comprising a second resonant capacitor and a second coil magnetically coupled to the first coil, wherein the second power converter is coupled to a ratio-controllable switched-capacitor power converter having an input voltage and an output voltage, and wherein the ratio-controllable switched-capacitor power converter comprises a plurality of power switches, and is configured such that a voltage ratio of the input voltage to the output voltage has different values in a first mode and in a second mode when the plurality of power switches are switched alternately in a charging stage and in a discharging stage; and
a control block configured to adjust the voltage ratio in response to a change in the system frequency or a change of strength of magnetic coupling between the first coil and the second coil such that the input voltage is in a predetermined range.

2. The system of claim 1, wherein a resonant frequency of at least one of the first resonator and the second resonator is configured to be adjusted during operation of the system.

3. The system of claim 2, wherein the corresponding resonator is configured to operate in two operation modes, and a duty cycle of one of the operation modes is adjustable, and wherein the resonant frequency of the corresponding resonator is different in these two operation modes.

4. The system of claim 1, wherein the control block is configured to change the system frequency to operate the system in at least two distinct frequency bands.

5. The system of claim 4, wherein a passive component or network is so configured such that its equivalent value is changed between the frequency bands through a passive switch network.

6. The system of claim 1, wherein a resonant frequency of the second resonator is approximately equal to the system frequency.

7. The system of claim 1, wherein the ratio-controllable switched-capacitor power converter comprises a controlled asymmetric capacitor network, and wherein the controlled asymmetric capacitor network is configured to operate in different configurations at the charging stage and at the discharging stage in at least one operation mode.

8. The system of claim 1, wherein an output-input voltage ratio of the ratio-controllable switched-capacitor power converter is configured to be adjusted in operation to reduce a power loss or magnetic emission of the system.

9. The system of claim 1, wherein the control block is configured such that power output regulation and performance optimization of the system can be performed in synchronization.

10. An apparatus for a power system configured to operate at a system frequency comprising:
a resonator having a first resonant capacitor and a first coil, wherein the first coil is configured to be magnetically coupled to a second coil of the power system;
a ratio-controllable switched-capacitor power converter coupled to the resonator through a second power converter and having an input voltage and an output voltage, wherein the ratio-controllable switched-capacitor power converter comprises a plurality of power switches, and wherein a voltage ratio of the output voltage to the input voltage is configured to have different values in a first mode and in a second mode when the plurality of power switches are switched alternately in a charging stage and in a discharging stage; and
a control block configured to adjust the voltage ratio in accordance with a change of the system frequency or a change of strength of magnetic coupling between the first coil and the second coil such that the input voltage is in a predetermined range.

11. The apparatus of claim 10, wherein the ratio-controllable switched-capacitor power converter comprises a controlled asymmetric capacitor network and a plurality of control switches, and wherein the voltage ratio is configured to be adjusted through control signals of the plurality of control switches such that a plurality of capacitors in the controlled asymmetric capacitor network is connected in series at a first stage and connected in parallel at a second stage in an operation mode.

12. The apparatus of claim 11, wherein the ratio-controllable switched-capacitor power converter further comprises an auxiliary inductor, and wherein some of the plurality of power switches and control switches are controlled with a phase shift between them, and a current of the auxiliary inductor reverses direction during a phase-shift transition to enable the corresponding power switches and control switches to be switched under a soft-switching condition.

13. The apparatus of claim 12, wherein the duration of the phase shift is adjusted in response to a change of a load, the input voltage or the output voltage of the ratio-controllable switched-capacitor power converter.

14. The apparatus of claim 12, wherein the auxiliary inductor comprises a parasitic inductor.

15. The apparatus of claim 11, wherein a duty cycle of at least one of the plurality of power switches is adjusted during an operation mode.

16. The apparatus of claim 11, wherein one of the plurality of power switches operates in a linear mode and the plurality of control switches are controlled to reduce a power loss of the corresponding power switch during an operation mode.

17. The apparatus of claim 11, wherein the output voltage is adjusted by changing the switching frequency of the power switches during an operation mode.

18. The apparatus of claim 10, wherein the system frequency is in at least two different frequency bands when the power system operates in different operation modes.

19. The apparatus of claim 10, wherein the voltage ratio is configured to be adjusted in response to a change of magnetic coupling strength between the first coil and the second coil such that a power loss or magnetic emission of the power system is reduced.

20. The apparatus of claim 10, wherein a bias network is configured to obtain energy from the second power converter and provide control power to a plurality of bias power rails in the ratio-controllable switched-capacitor power converter.

* * * * *